(12) United States Patent
Hansen

(10) Patent No.: US 9,656,844 B2
(45) Date of Patent: May 23, 2017

(54) HOIST SAFETY LOCK MECHANISM

(71) Applicant: Columbia Machine, Inc., Vancouver, WA (US)

(72) Inventor: Tim Hansen, Lake Oswego, OR (US)

(73) Assignee: COLUMBIA MACHINE, INC., Vancouver, WA (US)

( * ) Notice: Subject to any disclaimer, the term of this patent is extended or adjusted under 35 U.S.C. 154(b) by 378 days.

(21) Appl. No.: 14/491,340

(22) Filed: Sep. 19, 2014

(65) Prior Publication Data

US 2015/0076429 A1   Mar. 19, 2015

Related U.S. Application Data

(60) Provisional application No. 61/880,050, filed on Sep. 19, 2013.

(51) Int. Cl.
| | |
|---|---|
| *B66F 7/28* | (2006.01) |
| *B66F 17/00* | (2006.01) |
| *B66F 7/02* | (2006.01) |
| *B65G 57/03* | (2006.01) |

(52) U.S. Cl.
CPC .............. *B66F 17/00* (2013.01); *B66F 7/02* (2013.01); *B65G 57/035* (2013.01)

(58) Field of Classification Search
CPC ........... B66F 17/00; B66F 7/02; B65G 57/035
USPC ........................................................ 187/238
See application file for complete search history.

(56) References Cited

U.S. PATENT DOCUMENTS

| | | | | | |
|---|---|---|---|---|---|
| 1,399,729 | A | * | 12/1921 | Adams ....................... | B66F 1/06 74/141.5 |
| 2,266,915 | A | * | 12/1941 | Steedman ................. | B66F 7/02 187/208 |
| 2,498,422 | A | * | 2/1950 | Hermann ................... | B66F 1/06 187/359 |
| 2,558,401 | A | * | 6/1951 | Voigt ........................ | B66F 1/06 254/109 |
| 2,947,513 | A | * | 8/1960 | Nolden ...................... | B66F 7/04 254/134 |
| 3,985,207 | A | * | 10/1976 | Petit .......................... | B66F 7/04 187/208 |
| 4,050,545 | A | * | 9/1977 | Hunter ....................... | B66F 7/26 187/204 |

(Continued)

*Primary Examiner* — Michael Riegelman
(74) *Attorney, Agent, or Firm* — Schaffer IP Law, LLC

(57) ABSTRACT

A hoist safety lock mechanism includes a pair of pawls formed on terminal ends of each corner of a pallet support structure. The pawls are biased outward to an extended position and include a lower support surface adapted to rest on a support surface. The pawls may be pivotally deflected downward (but not upward) due to impact on a top surface of the pawl. Each pawl is configured to be received within a respective parallel column of slots formed on inwardly-facing sides of the vertical posts forming the lifting frame of the hoist. The slots within each column are vertically offset and separated by separators which can vertically deflect the pawls. Because the slots are vertically offset, and because each terminal end includes a pair of pawls, there is always at least one pawl engaged within the slot even if the other of the pair is deflected by contact with a separator. Thus, any failure of the hoist will cause the pallet support structure to only fall to the next lower separator before the pawl catches it.

14 Claims, 8 Drawing Sheets

(56) References Cited

U.S. PATENT DOCUMENTS

| | | | | |
|---|---|---|---|---|
| 4,856,618 | A * | 8/1989 | Isogai | B66F 7/04 187/208 |
| 5,803,206 | A * | 9/1998 | Halstead | B66F 7/04 187/208 |
| 6,382,358 | B1 * | 5/2002 | Kritzer | B66F 7/04 187/208 |
| 6,439,346 | B1 * | 8/2002 | Gradziuk | B66F 7/025 187/214 |
| 6,446,757 | B1 * | 9/2002 | Taylor | B66F 7/04 187/207 |
| 6,581,913 | B1 * | 6/2003 | Conomos | B66F 3/30 254/133 R |
| 7,143,869 | B1 * | 12/2006 | Chance | B66F 7/04 187/208 |
| 7,219,768 | B2 * | 5/2007 | Climenhaga | B66F 7/18 187/203 |
| 2006/0151247 | A1 * | 7/2006 | Raffler | B66F 7/12 187/208 |
| 2010/0059466 | A1 * | 3/2010 | Tanner | A47B 51/00 211/134 |
| 2010/0102284 | A1 * | 4/2010 | Drake | B66F 5/02 254/1 |
| 2012/0181494 | A1 * | 7/2012 | Guyard | B66F 3/00 254/385 |
| 2013/0233651 | A1 * | 9/2013 | Kritzer | B66F 7/20 187/208 |
| 2015/0329336 | A1 * | 11/2015 | Brown | B66F 7/28 254/89 H |

* cited by examiner

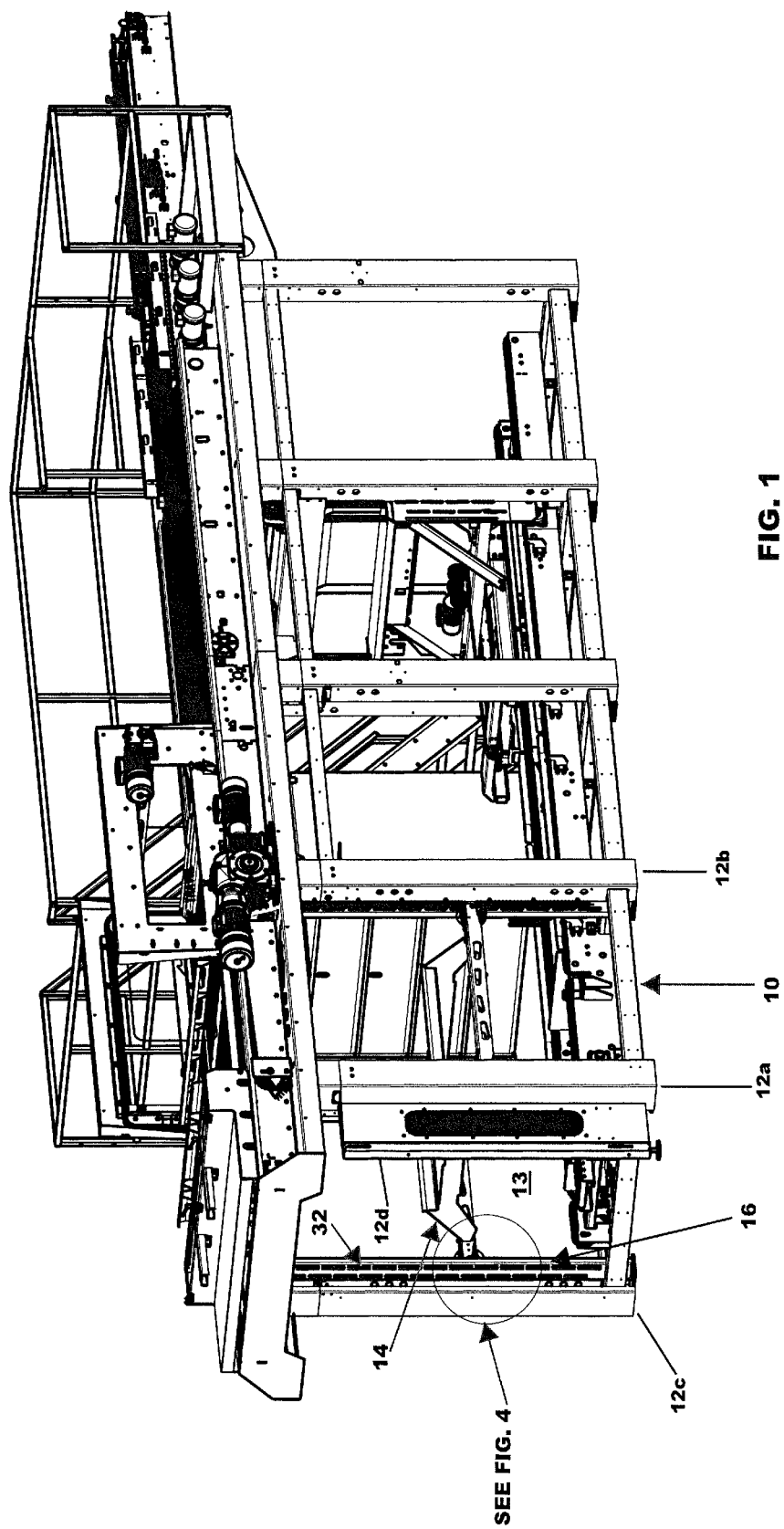

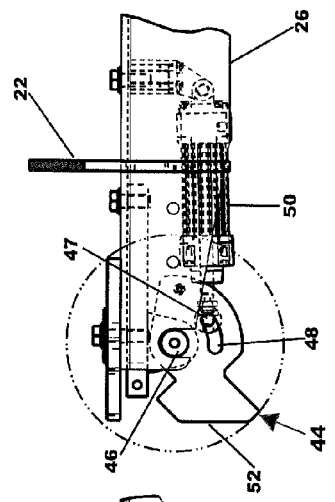
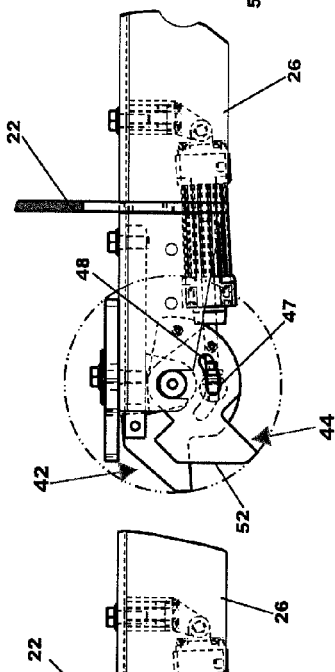
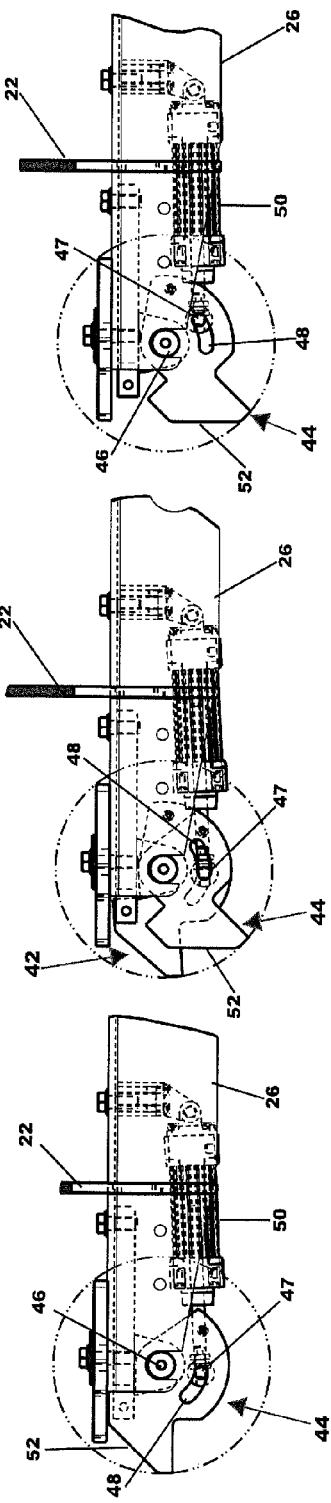
FIG. 5A
FIG. 6A
FIG. 7A
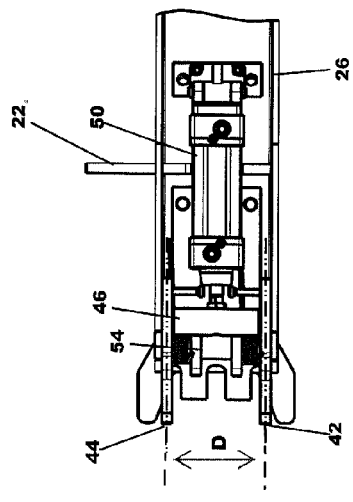
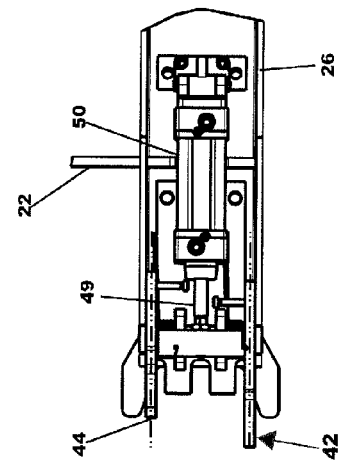
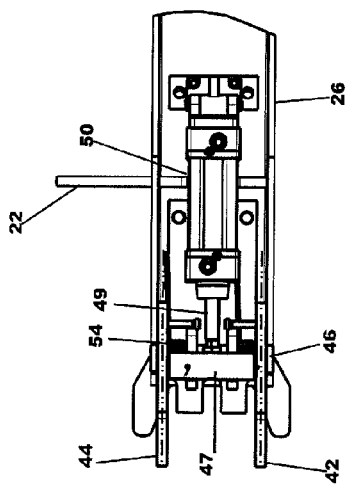
FIG. 5B
FIG. 6B
FIG. 7B

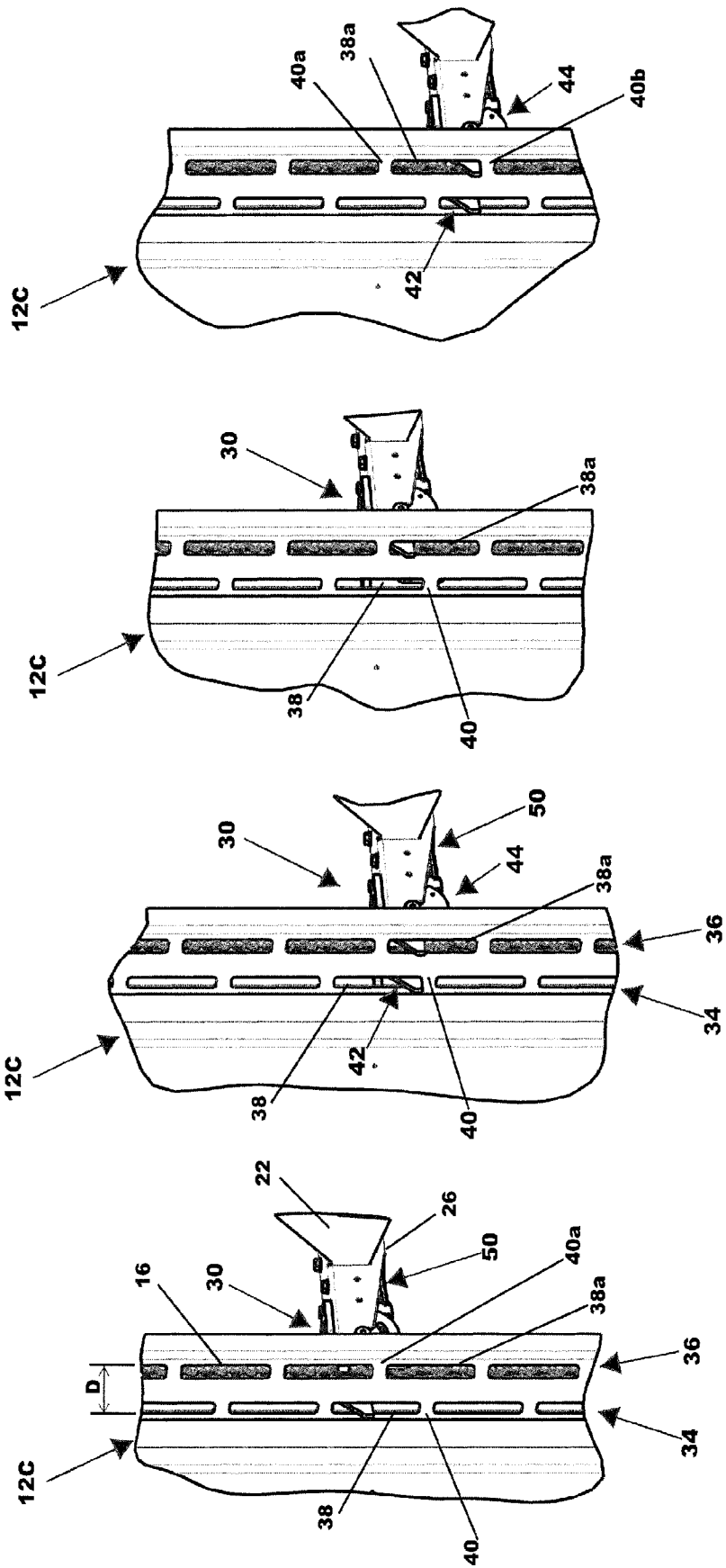

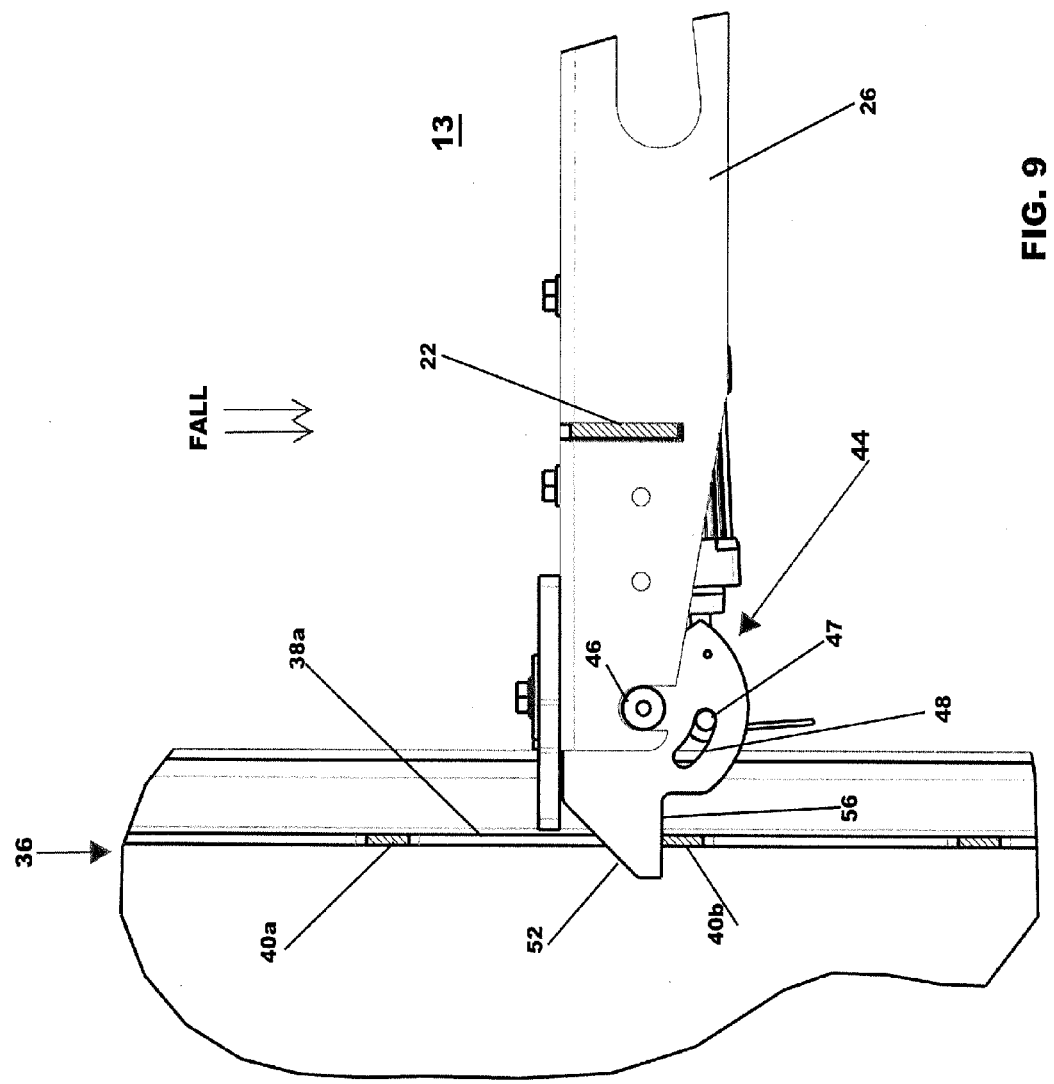

HOIST SAFETY LOCK MECHANISM

CROSS-REFERENCE TO RELATED APPLICATION

The present application claims the benefit of U.S. Provisional Patent Application No. 61/880,050, which is titled "HOIST SAFETY LOCK MECHANISM" and was filed on Sep. 19, 2013, the content of which is hereby incorporated by reference herein in its entirety.

BACKGROUND OF THE INVENTION

This invention relates generally to hoists and more particularly to safety locking mechanisms for such hoists.

Hoists, such as those used in the palletizer industry, are used to raise materials (typically stacked on wooden pallets) from a lower level to an upper level, or vice versa. A pallet stacked with materials is very heavy and could cause damage or injury if dropped or tipped due to equipment failure.

A need arises, therefore, for a more failsafe method for preventing a pallet or other heavy object loaded onto a hoist from falling.

SUMMARY OF THE INVENTION

The invention comprises generally a pallet lift with a safety stop mechanism. The pallet lift is of the type that includes a plurality of vertical posts defining a lifting space within which a pallet is lifted from a lower position to an upper position. Two parallel columns of apertures are formed parallel to a long axis of inwardly-facing surfaces of each of the posts. The apertures in each of the two parallel columns comprise elongated slots spaced from one another by separators, where separators from a first of the parallel columns are vertically offset from separators defined on a second of the parallel columns within the same vertical post. The pallet lift further includes a pallet support structure configured to be received within the lifting space and having a support surface configured to support and lift the pallet. The pallet support structure further includes terminal ends adjacent each of the vertical posts on each corner of the lifting space. The safety stop mechanism is comprised of two pawl structures positioned on each terminal end of the pallet support structure and spaced apart an amount sufficient to enable the two pawl structures to be received within the parallel columns of apertures.

Each pawl is configured to be received within a respective parallel column of slots formed on inwardly-facing sides of the vertical posts forming the lifting frame of the hoist. The slots within each column are preferably vertically offset and separated by separators which can vertically deflect the pawls. Because the slots are vertically offset, and because each terminal end includes a pair of pawls, there is always at least one pawl engaged within the slot even if the other of the pair is deflected by contact with a separator. Accordingly, should the pallet fall the pawls will catch on the lower adjacent separator and prevent further movement downward.

The foregoing and other objects, features and advantages of the invention will become more readily apparent from the following detailed description of a preferred embodiment of the invention that proceeds with reference to the accompanying drawings.

BRIEF DESCRIPTION OF THE DRAWINGS

FIG. 1 is perspective view of a pallet lift system as configured according to teachings of the invention.

FIG. 5A is a side elevation view of the pawl structure of FIG. 3 with both pawls in an extended position with an actuator in a first, extended position.

FIG. 5B is a bottom plan view of the structure of FIG. 5A.

FIG. 6A is a side elevation view of the pawl structure of FIG. 3 with one pawl in a deflected position with an actuator in a first, extended position.

FIG. 6B is a bottom plan view of the structure of FIG. 6A.

FIG. 7A is a side elevation view of the pawl structure of FIG. 3 with both pawls in a deflected position by action of an actuator in a second, retracted position.

FIG. 7B is a bottom plan view of the structure of FIG. 7A.

FIG. 8A-8D are successive views of the pawl structure of FIG. 3 engaged at different vertical levels within the parallel, offset slot structure of FIG. 4 showing deflection of at most one pawl at a time (but not both of the pawls) due to contact with separators between the slots.

FIG. 9 is a side-section view of FIG. 8D showing the pawl in an emergency resting position on a separator according to teachings of the invention.

DETAILED DESCRIPTION

FIG. 1 illustrates a hoist structure at 10 integrated within a palletizing machine according to a configuration of the invention. The hoist structure 10 is part of a palletizing machine which is used to arrange materials in a layer according to the end users requirement and stack them on a pallet. In general usage, the pallet support receives a prearranged layer of material and then indexes downwards approximately one layer height in order to receive a subsequent layer of material. This process is repeated until the desired number of layers is obtained on the pallet. Once the desired number of layers are on the pallet, the pallet support travels downwards to a lower position where the pallet with layers of material discharges from the machine and an empty pallet is conveyed onto the pallet support. After the pallet support receives an empty pallet it travels to an uppermost position to receive more material.

A hoist section is generally shown at 10 and comprises vertical posts 12a-12d formed at each of the four corners of the hoist, a pallet support frame 14, and a mechanical lifting mechanism comprising a chain drive 16 coupled to a motor (not shown). The vertical posts 12a-12d define a lifting space 13 in which a pallet is lifted as discussed further below.

Figure 2A:
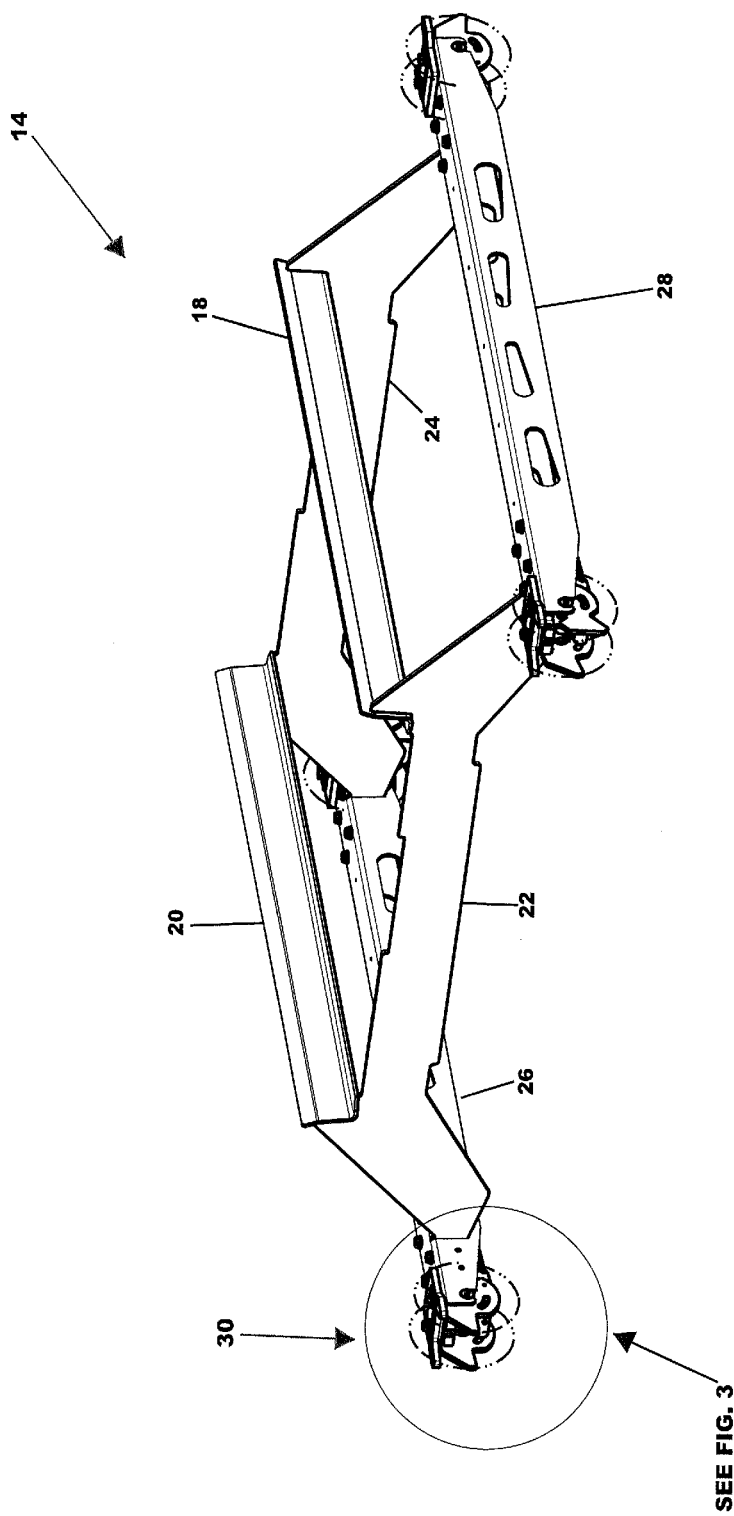
FIG. 2A is a perspective view of a first type of pallet support structure used within the lift of FIG. 1.

Turning to FIG. 2A, pallet support frame 14 includes a raised support surface characterized by two parallel support members 18, 20. Front and back framing members 22, 24 couple to terminal ends of the support members 18, 20 and fix such members relative to one another. Finally, left and right framing members 26, 28 couple to terminal ends of framing members 22, 24 to form a completed frame periphery. The pallet support frame is configured to be received within the lifting space 13 defined between the vertical posts 12a-12d of the hoist.

A safety lock mechanism, shown generally at 30, is coupled to each end of framing members 26, 28 so that a safety lock mechanism 30 is formed on each of the four corners of the pallet support frame 14. Each of the safety lock mechanisms 30 engage with complementary structures 32 (FIG. 4) formed along a respective post 12a-12d—for instance, safety lock mechanism 30 engages within parallel columns of slots 38 (FIG. 4) formed along adjacent post 12a.

Figure 2B:
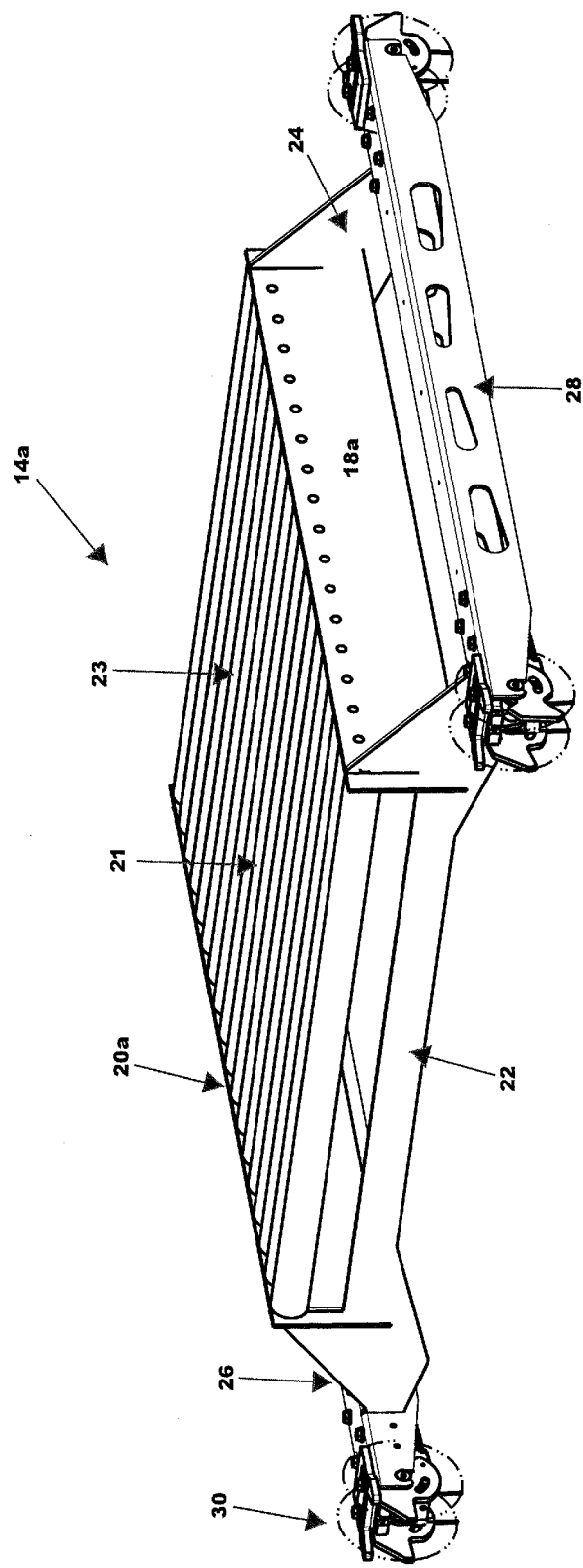
FIG. 2B is an alternate type of pallet support structure used within the lift of FIG. 1.

FIG. 2B illustrates an alternate embodiment of a pallet support frame 14a configured according to the invention. The alternative pallet support frame 14a includes similar structures to support frame 14, including framing members 22, 24, 26, and 28, and safety lock mechanisms 30 formed on each of the four corners of the pallet support frame 14a. Frame 14a differs from frame 14 in that it is configured as a roller conveyor or a belt conveyor in place of the pallet support members 18, 20. Pallet support frame 14a is of a roller conveyor type, and includes a plurality of rollers, such as rollers 21 and 23, arranged in parallel between support members 18a, 20a and freely rotatable so that a pallet or material on the roller is easily moved on or off the supporting surface.

Figure 4:
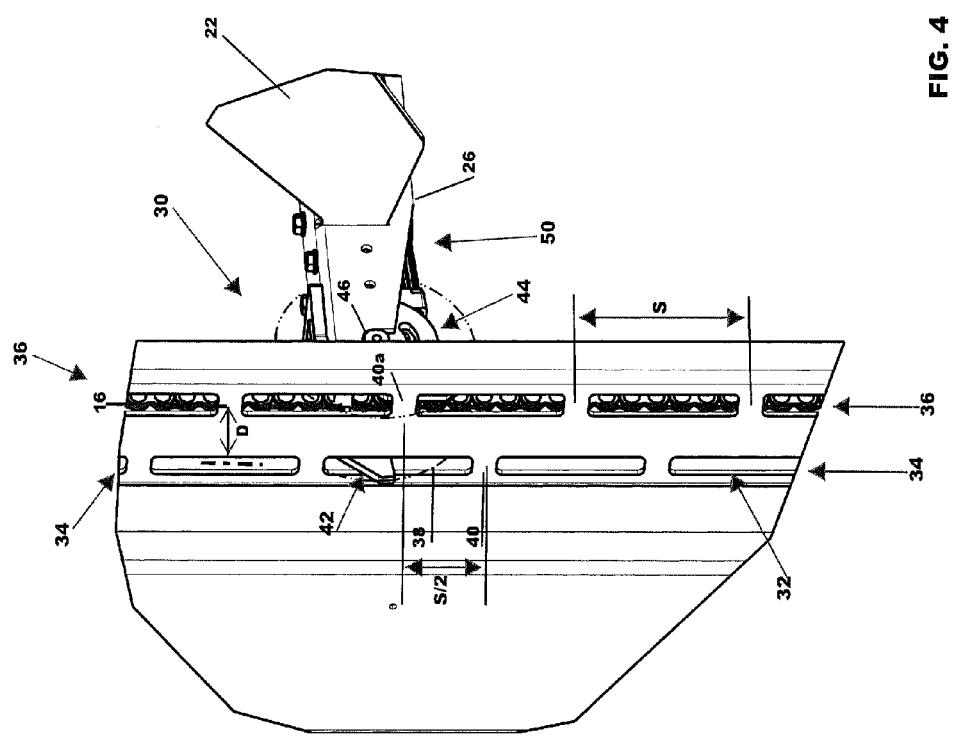
FIG. 4 is a close-up of the slot structure into which the pawls engage per the teachings of the invention.

In a preferred embodiment, the complementary structures 32 (FIG. 4) formed in a respective post, e.g. post 12a, that engage with the safety lock mechanisms 30 of the invention include an array of webbing formed by two parallel columns 34, 36 of slots, e.g. slot 38, formed on an inwardly-facing side of the respective post 12a. Each of the slots, e.g. slot 38, is bounded on top and bottom from an adjacent slot within the column by a reinforced separation structure, e.g. separator 40. There are multiple separators formed in each of the columns, with separators preferably formed with a spacing S of not greater than 7.8 inches (200 mm). Separators 40 in each of the two parallel columns 34, 36 are vertically offset for safety reasons that will be described further below. For instance, and as shown in FIG. 4, separator 40 in slot column 34 is vertically offset from separator 40a in slot column 36 by a vertical distance of half the spacing between the separators within each column, or S/2.

Figure 3:
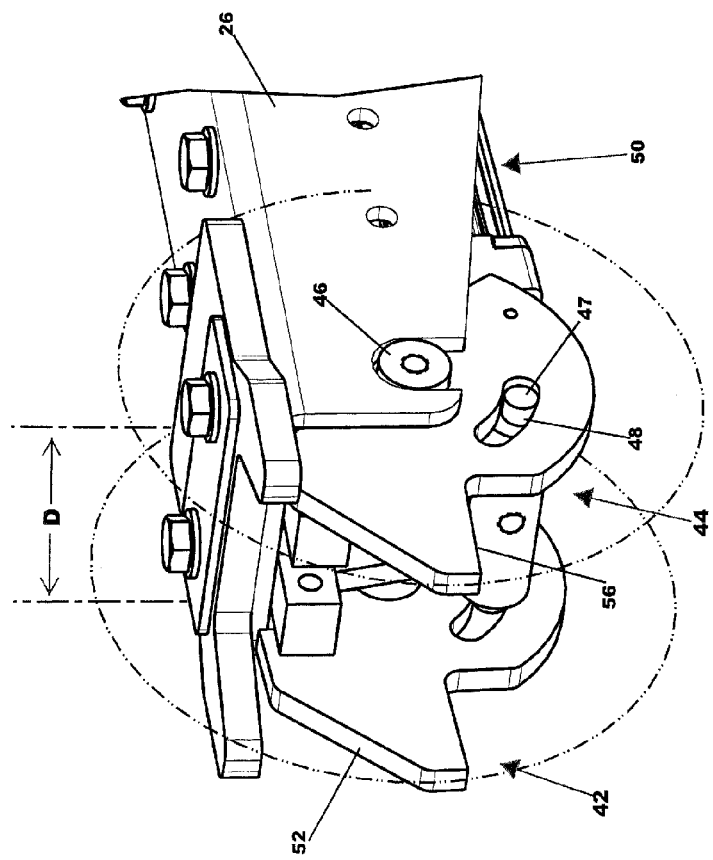
FIG. 3 is a close-up of the pawl structure forming the safety stop mechanism of the present invention.

As shown in FIG. 3, each safety lock mechanism includes two horizontally spaced pawl structures 42, 44 that are commonly coupled together via a hinge pin 46 and a retraction pin 47. The retraction pin 47 is received within an arcuate slot 48 formed in a bottom portion of each of the pawl structures 42, 44 and is coupled to the piston 49 of cylinder 50 (FIG. 5B). Pin 47 is moved forwardly and rearwardly under action of a cylinder 50. In operation, the emergency stop device may be triggered to place the pawls 42, 44 in a retracted position (as shown in FIGS. 7A, 7B) or enable the pins to extend to an emergency stop position (FIGS. 5A, 5B, 6A, 6B). Each of the pawls 42, 44 includes an angled top surface, e.g. angled surface 52, and is biased to an extended position (when also extended by cylinder 50) by action of spring 54 (FIG. 5B).

The pawl structures 42, 44 are horizontally spaced from one another by the same distance D as the two parallel columns 34, 36 of slots that are formed on inwardly-facing sides of the vertical posts 12a-12d. Each of the pawl structures 42, 44 are configured to be received within respective slots of the columns 34, 36. When the pawls are retracted, as by cylinder 50 (shown in FIGS. 7A and 7B), the pawls do not interact or contact the separators 40 formed between each of the slots within each column 34, 36. When the pawls are extended as shown in FIGS. 5A, 5B, 6A, and 6B, however, the pawls are nominally received within the slots, e.g. pawl 42 in slot 38 as shown in FIG. 4. Should a pawl, e.g. pawl 44, contact a separator 40a as it rotates up into position within the respective slot, as shown in FIG. 4, then the angled surface 52 causes the pawl to deflect downward and out of the way of the separator 40a as shown in FIGS. 6A and 6B. However, because there are two pawls for each corner of the hoist, and because the separators are offset with respect to those formed in the column 36 adjacent the first column 34, then it is assured that one pawl will always be engaged within the slot at each corner at all times.

FIGS. 8A-8D show a progression of four stop positions of the pallet lifting structure as it descends within the lifting space 13 and along one of the vertical support members 12c (the other support members 12a, 12b, and 12D are not shown). Upon activation of an emergency stop, air pressure is removed from cylinder 50 allowing it to extend due to the action of spring 54 acting on the pawls 42, 44 via pin 47 and piston 49 (not shown). With retraction of the pawls disengaged by operation of the emergency stop, pawls 42, 44 then attempt to rotate upward around hinge pin 46 and under biasing action of spring 54 (FIG. 5B). Whether the pawls 42, 44 rotate fully into engagement within respective their respective slot column 34, 36 depends upon the location of the separators between the slots, here separators 40, 40a.

FIG. 8A shows the leftmost pawl 42 engaged within slot 38, but rightmost pawl 44 blocked by separator 40a. Should the lift 10 fail, then the pallet frame 14 would at most drop to the bottom of slot 38 as shown in FIG. 8B.

FIG. 8B shows both pawls engaged within respective slots 38, 38a. Should the lift 10 fail, then the pallet frame 14 would at most drop to the bottom of slot 38 (e.g. rest on separator 40) as shown in FIG. 8B.

FIG. 8C shows the leftmost pawl blocked by separator 40, but the rightmost pawl engaged within slot 38a. Should lift 10 fail, then the pallet frame 14 would at most drop to the bottom of slot 38a (e.g. rest on separator 40b) as shown in FIG. 8D.

FIG. 8D shows both pawls engaged within respective slots. Should the lift 10 fail, then the pallet frame 14 would at most drop to the bottom of slot 38a (e.g. rest on separator 40b) as shown in FIG. 8D.

The parallel columns of offset slots 34, 38 and their respective pawls 42, 44 ensures that at least one pawl is engaged and also limits the maximum distance that the lift mechanism drops before contacting a physical stop structure. As shown in FIG. 9, should the hoist mechanism fail and the pallet support frame drop within lifting space 13, then the pallet support frame will only drop a short distance before pawl supporting surface 56 meets the lower adjacent separator 40b and stops further downward movement of the pallet.

Having described and illustrated the principles of the invention in a preferred embodiment thereof, it should be apparent that the invention can be modified in arrangement and detail without departing from such principles. I claim all modifications and variation coming within the spirit and scope of the invention.

What is claimed is:

1. A pallet lift with a safety stop mechanism, comprising:
vertical posts defining a lifting space within which a pallet is lifted from a lower position to an upper position;
two parallel columns of apertures formed parallel to a long axis of and on inwardly-facing surfaces of each of the posts, the apertures in each of the two parallel columns comprising elongated slots spaced from one another by separators, where separators from a first of the parallel columns are vertically offset from separators defined on a second of the parallel columns within the same vertical post;
a pallet support structure configured to be received within the lifting space and having a support surface configured to support and lift the pallet, the pallet support structure further including terminal ends adjacent each of the vertical posts on each corner of the lifting space;

two pawl structures positioned on each terminal end of the pallet support structure and spaced apart an amount sufficient to enable the two pawl structures to be received within the parallel columns of apertures.

2. The pallet lift with safety stop mechanism of claim 1, further including:

an angled top surface formed on each of the pawl structures, each such pawl being biased in an extended position and pivotally moveable out of a slot when in contact with at least one of the separators formed between the slots.

3. The pallet lift of claim 2, further including an arcuate slot formed in each of the two pawl structures and a pin received in the slot for effecting pivoting movement of the pawl.

4. The pallet lift of claim 1, further including an actuator coupled to the two pawl structures and configured to move the two pawl structures between an extended position and a retracted position with respect to a respective terminal end of the pallet support structure.

5. The pallet lift of claim 1, further including a hinge pin commonly coupling said two pawl structures together for independent rotational movement by each pawl structure about the hinge pin.

6. The pallet lift of claim 1, wherein each of the two pawl structures is biased to an extended position in a first mode where the pawl structures are configured to be received within the parallel columns of apertures.

7. The pallet lift of claim 1, wherein each of the two pawl structures is configured to be maintained in a retracted position in a second mode so that the pawl structures are not received within the parallel columns of apertures.

8. The pallet lift of claim 1, wherein the spacing between separators within a single one of the two parallel columns are no greater than 200 mm.

9. The pallet lift of claim 1, wherein the vertical spacing between a separator in a first of the two parallel columns is no greater than 100 mm from a closest separator in a second of the two parallel columns.

10. A safety stop mechanism for a pallet lift comprising:

first and second pawls coupled in spaced apart horizontal arrangement to a pallet lift platform, with each of the pawls having a retracted position and an extended position;

an array of webbing having a first column of apertures in opposition to the first pawl and a second column of apertures, vertically offset with respect to the first column of apertures, in opposition to the second pawl, said first and second pawls configured to move vertically in tandem along the first and second column of apertures, respectively, and be received within a respective aperture when in an extended position and not received when in a retracted position; and the pawls and webbing being arranged such that at least one of the first and second pawls will always be received within a respective aperture as the pawls move vertically in tandem along the first and second column of apertures.

11. The safety stop mechanism of claim 10, further including a set of first and second pawls at a plurality of corners of the pallet lift platform so that at least one of the first and second pawls at each of the plurality of corners is received within a respective aperture.

12. The safety stop mechanism of claim 10, wherein in each column of apertures, separators are interposed between each aperture and its adjacent apertures, and wherein contact of either the first or second pawl with the separator causes the first or second pawl to rotate to a retracted position.

13. The safety stop mechanism of claim 12, wherein each of the first and second pawls includes an angled upper surface configured to contact the separator during upward movement of the pawl and deflect the pawl downward to the retracted position.

14. The safety stop mechanism of claim 10, further including a cylinder coupled to both the first and second pawls and configured to retract both the first and second pawls to a retracted position so that the pallet lift may be lowered.

\* \* \* \* \*